United States Patent
Endo et al.

(10) Patent No.: US 7,495,653 B2
(45) Date of Patent: Feb. 24, 2009

(54) INFORMATION PROCESSING APPARATUS AND OPERATION METHOD THEREOF

(75) Inventors: Yoshihiko Endo, Tokyo (JP); Tooru Akasaka, Tokyo (JP)

(73) Assignee: NEC Personal Products, Ltd., Tokyo (JP)

(*) Notice: Subject to any disclaimer, the term of this patent is extended or adjusted under 35 U.S.C. 154(b) by 736 days.

(21) Appl. No.: 10/980,434

(22) Filed: Nov. 4, 2004

(65) Prior Publication Data

US 2005/0093827 A1    May 5, 2005

(30) Foreign Application Priority Data

Nov. 4, 2003    (JP)    ............... 2003-375042

(51) Int. Cl.
*G09G 5/00*    (2006.01)
(52) U.S. Cl. .................. 345/156; 345/169; 345/204
(58) Field of Classification Search ......... 345/156–169, 345/204–215
See application file for complete search history.

(56) References Cited

U.S. PATENT DOCUMENTS 6,362,440 B1 *    3/2002    Karidis et al. ............ 178/18.01
6,373,503 B1 *    4/2002    Perkes ....................... 715/718
6,664,949 B1 *    12/2003    Amro et al. ................ 345/168
2003/0222843 A1 *    12/2003    Birmingham ............... 345/156

FOREIGN PATENT DOCUMENTS

| JP | 3-225404 | 10/1991 |
| JP | 5-19925 | 1/1993 |
| JP | 2001-125671 | 5/2001 |
| JP | 2003-271280 | 9/2003 |

OTHER PUBLICATIONS

Office Action from Japan Patent Office with English translation issued on Jun. 27, 2007.

* cited by examiner

*Primary Examiner*—Vijay Shankar
(74) *Attorney, Agent, or Firm*—Young & Thompson

(57) ABSTRACT

A information processing apparatus includes a display unit, a first input unit, a second input unit, a first coupling unit, and a second coupling unit. The first coupling unit rotatably couples the display unit with a first side of the first input unit. The second coupling unit rotatably couples the second input unit with a second side of the first input unit.

11 Claims, 10 Drawing Sheets

Fig. 8

| SENSOR 4 / SENSOR 5 | ON | OFF |
|---|---|---|
| ON | S4 | S1 |
| OFF | S3 | S2 |

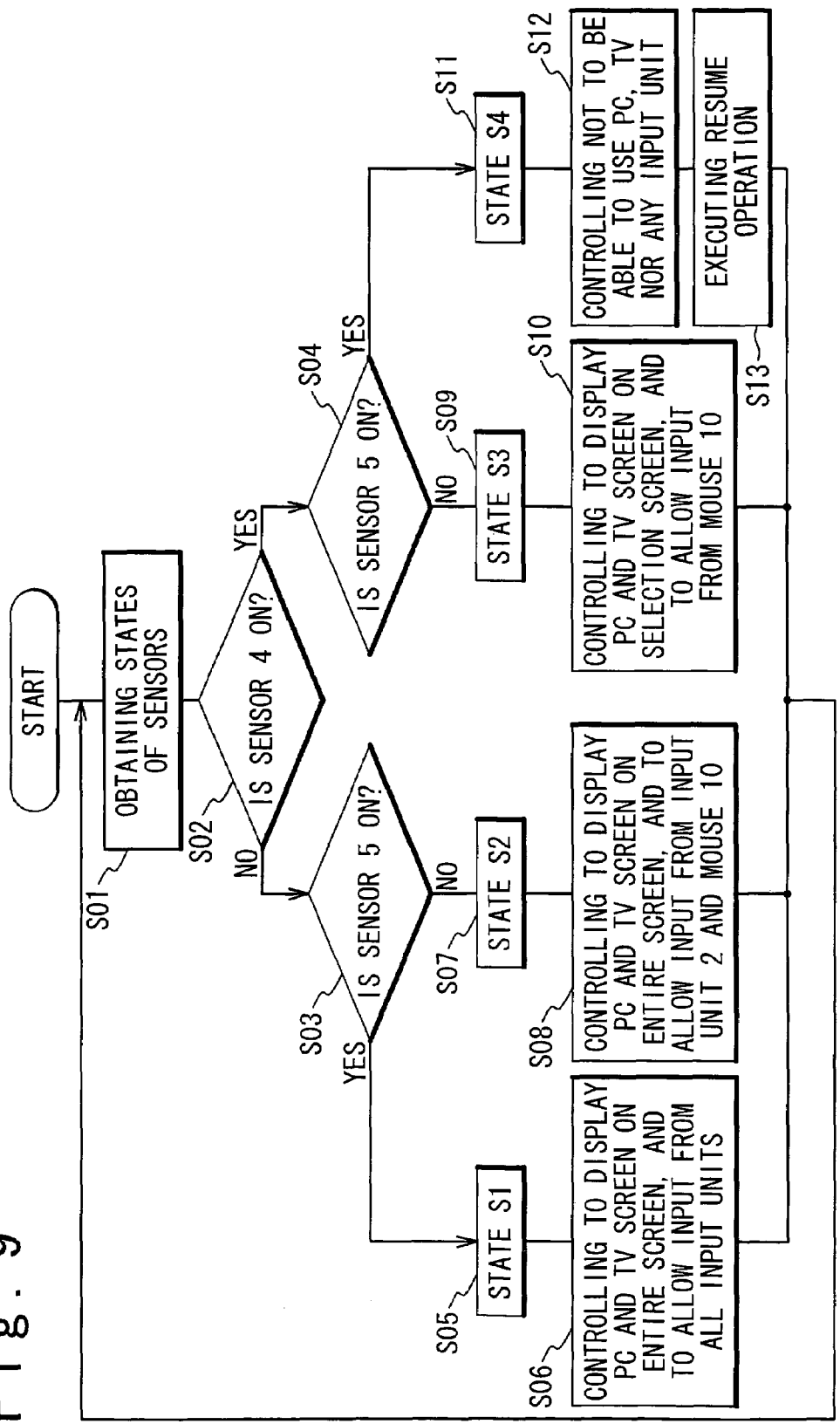

INFORMATION PROCESSING APPARATUS AND OPERATION METHOD THEREOF

BACKGROUND OF THE INVENTION

1. Field of the Invention

The present invention relates to an information processing apparatus and an operation method thereof.

2. Description of the Related Art

A computer is known in which a flat panel display and a computer body are integrated into one unit. This has a function of pulling out a keyboard at a time of usage and accommodating the keyboard at a time of non-usage, so as not to disturb the other tasks.

A computer is known which receives a television broadcast and displays it on a display. The computer starts an application for displaying the television broadcast after being activated. Then, the computer displays the television broadcast on a displaying screen. That is, it is necessary to activate the computer as a computer at first, and also it is necessary for a user to be able to use the computer.

In conjunction with the above description, for example, Japanese Laid Open Patent Application JP-A 2003-271280 discloses the technique of an electronic apparatus, a control method thereof and a program thereof. The electronic apparatus has an input/output unit. The electronic apparatus includes an installing means, a detecting means and a display controlling means. The installing means makes the input unit attach at the portion near the low end of a display unit. The detecting means detects that a part of a display region of the display unit is covered with the input/output unit. The display controlling means controls the display manner of the portion which is not covered with the input unit in the display region of the display unit, while the state is detected by the detecting means.

Japanese Laid Open Patent Application JP-A 2001-125671 discloses the technique of a keyboard accommodation type computer. The keyboard accommodation type computer is a desktop computer in which a display and a computer body are integrated into one unit. Between the portion under the display and the surface of the desk on which the computer is placed, a part of the keyboard can be accommodated from the state at which it is placed directly on the desk, so as to be accommodated in the outer circumferential space of the computer.

Japanese Laid Open Patent Application JP-A Heisei 3-225404 discloses the technique of a personal computer. The personal computer is the portable personal computer in which a displaying device is rotatably fixed through a hinge mechanism to a body with a keyboard. This includes the keyboard, a means for checking the state of the keyboard, a means for supplying a electric power supply off signal, and a means for continuously executing an operation. The keyboard is placed so as to be accommodated in and pulled from the body. The means for checking the state of the keyboard reports the state in which the keyboard is accommodated or pulled, to a CPU installed in the body. The means for supplying the electric power supply off signal supplies the electric power supply off signal to a electric power supply unit placed in the body, after returning the state data of the executed program before the accommodation state of the keyboard. The means for continuously executing the operation turns on the electric power supply of the body when the keyboard is at the pulled state, and recovers the state data of the program, and continuously executes the operation.

SUMMARY OF THE INVENTION

Therefore, an object of the present invention is to provide an information processing apparatus which suppresses erroneous operation even though a plurality of input units (input devices) corresponding to a plurality of functions is included, and an operating method thereof.

Another object of the present invention is to provide an information processing apparatus which does not induce any obstruction even though a plurality of input units (input devices) corresponding to a plurality of functions is included, and an operating method thereof.

Still another object of the present invention is to provide an information processing apparatus which automatically adjusts a usable function, corresponding to a state of an attached input unit (input device), and an operating method thereof.

This and other objects, features and advantages of the present invention will be readily ascertained by referring to the following description and drawings.

In order to achieve an aspect of the present invention, the present invention provides a information processing apparatus including a display unit, a first input unit, a second input unit, a first coupling unit and a second coupling unit. The first coupling unit rotatably couples the display unit with a first side of the first input unit. The second coupling unit rotatably couples the second input unit with a second side of the first input unit.

In the information processing apparatus, the display unit may have a display surface. The first input unit may have a first surface on which a first input operating unit is placed for an input operation; and a second surface which is a side opposite to the first surface. The second input unit may have a third surface on which a second input operating unit is placed for an input operation; and a fourth surface which is a side opposite to the third surface. The second input unit is foldable such that the fourth surface faces the second surface.

In the information processing apparatus, the first input unit may be foldable such that the first surface overlaps with a part of the display surface.

In the information processing apparatus, the second input unit may be foldable such that the third surface overlaps with a remaining part of the display surface, when the first input unit is folded such that the first surface overlaps with the part of the display surface.

The information processing apparatus may further include a control unit which controls the display unit. The control unit may control to accept inputs from the first input unit and the second input unit, when the display unit, the first input unit and the second input unit do not overlap with each other.

In the information processing apparatus, the control unit may control not to accept input from the second input unit, when the first input unit and the second input unit overlap with each other such that the second surface faces the fourth surface and the first input unit does not overlap with the display unit.

In the information processing apparatus, the control unit may control not to accept inputs from the first input unit and the second input unit, when the first input unit and the second input unit overlap with each other such that the second surface faces the fourth surface and the first input unit and the display unit overlap with each other such that the first surface faces the display surface.

In the information processing apparatus, the control unit may control not to accept inputs from the first input unit and the second input unit and not to display anything on the display unit, when the display unit overlaps with the first input unit and the second input unit such that the display surface faces the first surface and the third surface.

The information processing apparatus may further include a first detector and a second detector. The first detector may be placed in at least one of the display unit and the first input unit, and detect a positional relation between the display unit and the first input unit. The second detector may be placed in at least one of the first input unit and the second input unit, and detect a positional relation between the first input unit and the second input unit. The control unit may control input from the first input unit and the second input unit and displaying on the display unit, based on the detection results form the first detector and the second detector.

In the information processing apparatus, the first input operating unit may select at least one of a information processing function and a television function for operation in the information processing apparatus, based on an input of a user.

In order to achieve another aspect of the present invention, the present invention provides an operation method of an information processing apparatus. The information processing apparatus includes a display unit, a first input unit, a second input unit, a first coupling unit and a second coupling unit. The display unit has a display surface. The first input unit has a first surface on which a first input operating unit is placed for an input operation; and a second surface which is a side opposite to the first surface. The second input unit has a third surface on which a second input operating unit is placed for an input operation; and a fourth surface which is a side opposite to the third surface. The first coupling unit rotatably couples the display unit with a first side of the first input unit. The second coupling unit rotatably couples the second input unit with a second side of the first input unit. The operation method of the information processing apparatus includes (a) detecting a positional relation among the display unit, the first input unit and the second input unit; and (b) accepting inputs from the first input unit and the second input unit, when the display unit, the first input unit and the second input unit do not overlap with each other.

The operation method of the information processing apparatus may further include (c) accepting no input from the second input unit, when the first input unit and the second input unit overlap with each other such that the second surface faces the fourth surface and the first input unit does not overlap with the display unit.

The operation method of the information processing apparatus may further include (d) accepting no input from the first input unit and the second input unit, when the first input unit and the second input unit overlap with each other such that the second surface faces the fourth surface and the first input unit and the display unit overlap with each other such that the first surface faces the display surface.

The operation method of the information processing apparatus may further include (e) accepting no input from the first input unit and the second input unit and not to display anything on the display unit, when the display unit overlaps with the first input unit and the second input unit such that the display surface faces the first surface and the third surface.

In order to achieve still another aspect of the present invention, the present invention provides a computer program product, for an operation method of an information processing apparatus, embodied on a computer-readable medium. The information processing apparatus includes a display unit, a first input unit, a second input unit, a first coupling unit and a second coupling unit. The display unit has a display surface. The first input unit has a first surface on which a first input operating unit is placed for an input operation; and a second surface which is a side opposite to the first surface. The second input unit has a third surface on which a second input operating unit is placed for an input operation; and a fourth surface which is a side opposite to the third surface. The first coupling unit rotatably couples the display unit with a first side of the first input unit. The second coupling unit rotatably couples the second input unit with a second side of the first input unit. And the computer program product includes code that, when executed, causes a computer to perform the following (a) detecting a positional relation among the display unit, the first input unit and the second input unit; and (b) accepting inputs from the first input unit and the second input unit, when the display unit, the first input unit and the second input unit do not overlap with each other.

The computer program product may further includes code that, when executed, causes a computer to perform the following (c) accepting no input from the second input unit, when the first input unit and the second input unit overlap with each other such that the second surface faces the fourth surface and the first input unit does not overlap with the display unit.

The computer program product may further includes code that, when executed, causes a computer to perform the following (d) accepting no input from the first input unit and the second input unit, when the first input unit and the second input unit overlap with each other such that the second surface faces the fourth surface and the first input unit and the display unit overlap with each other such that the first surface faces the display surface.

The computer program product may further includes code that, when executed, causes a computer to perform the following (e) accepting no input from the first input unit and the second input unit and not to display anything on the display unit, when the display unit overlaps with the first input unit and the second input unit such that the display surface faces the first surface and the third surface.

BRIEF DESCRIPTION OF THE DRAWINGS

FIG. 8 is a table showing the correspondence between the states of the sensor 4 and 5 and the states S1 to S4; and FIG. 9 is a flowchart showing the embodiment of the operating method of the information processing apparatus of the present invention.

DESCRIPTION OF THE PREFERRED EMBODIMENTS

Embodiments of an information processing apparatus and an operating method thereof according to the present invention will be described below with reference to the attached drawings. In this embodiment, a personal computer (hereafter, also referred to as a PC) is explained as the information processing apparatus. However, the present invention can be applied to a different information processing apparatus with a display and an input unit, and a mobile (portable) information terminal.

At first, the configuration of the embodiment of the information processing apparatus in the present invention will be described with reference to the attached drawings.

Figure 1A:
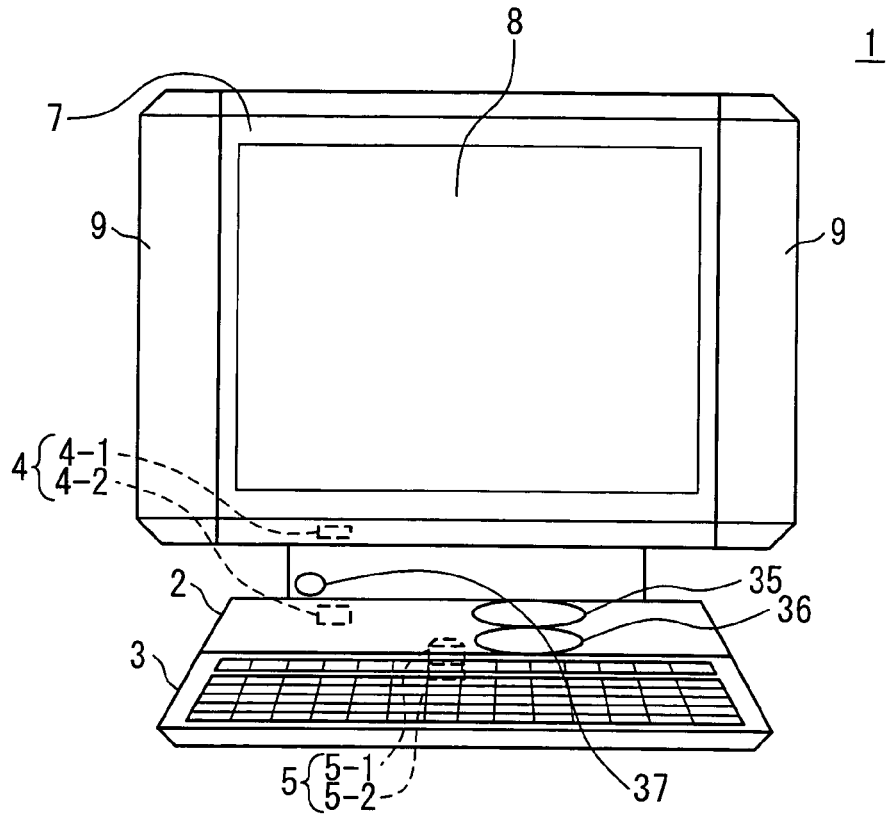
FIGS. 1A and 1B are the appearance views showing the configuration of the embodiment of the information processing apparatus of the present invention.
Figure 1B:
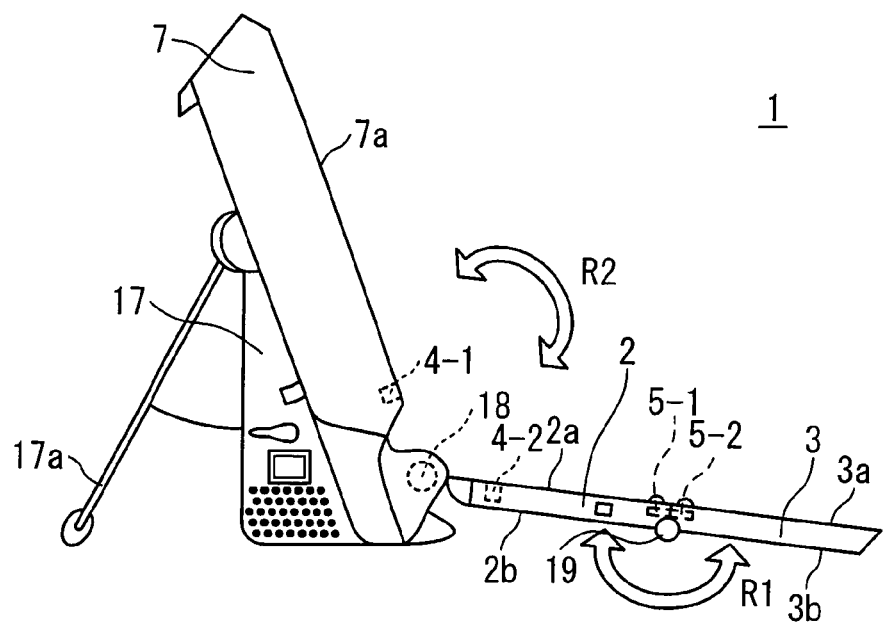

FIGS. 1A and 1B are the appearance views showing the configuration of the embodiment of the personal computer to which the information processing apparatus of the present invention is applied. FIG. 1A is the view from the front, and FIG. 1B is the view from the side. A PC 1 includes a display unit 7, an input unit (first input unit) 2, an input unit (second input unit) 3, a hinge unit (first coupling unit) 18, a hinge unit (second coupling unit) 19, a sensor (first detector) 4, a sensor (second detector) 5 and a PC body 17.

The display unit 7 includes a display 8 and sound units 9. The display 8 is exemplified as a flat panel display such as a liquid crystal display, an electro-luminescence display and a plasma display. The display 8 is placed integrally with the PC body 17, so as to be supported by the PC body 17. The display 8 can display both a PC screen and TV screen simultaneously. The sizes of these screens can be changed in the display 8 by using, for example, a pointer controlled by a mouse. The sound units 9 are exemplified as speakers, and placed integrally with the display 8 on both sides thereof. A remote control receiver 37 is contained at the low end of the display unit 7.

The PC body 17 has an information processing function of the personal computer body and a television function as a television (hereafter, also referred to as [TV]). The PC body 17 is supported by a support member 17a, integrally with the display unit 7. The support member 17a is adjusted such that a display surface 7a of the display unit 7 has a desirable angle with respect to a horizontal plane. The PC body 17 has ports (terminals) for connecting cables of a TV antenna, a mouse, a printer and so on.

The input unit (first input unit) 2 includes a selector 35 and a TV operation unit 36. The selector 35 selects at least one of the TV function and information processing function of the PC 1, through a switch. The TV operation unit 36, while receiving a TV broadcast, changes a TV channel and adjusts a sound volume. The input unit 2 contains a first surface 2a and a second surface 2b. On the first surface 2a, it is possible to operate the selector 35 and the TV operation unit 36. The second surface 2b is a side opposite to the first surface 2a.

The input unit (second input unit) 3 includes a keyboard 13 serving as the input unit when the information processing function of the PC 1 is used. The input unit 3 contains a third surface 3a and a fourth surface 3b. On the third surface 3a, it is possible to operate the keyboard 13. The fourth surface 3b is a side opposite to the third surface 3a.

The hinge unit (first coupling unit) 18 is the hinge mechanism for rotatably coupling the low end of the display unit 7 and one side (a first side) of the input unit 2. The input unit 2 can be rotated relatively to the display unit 7, as indicated by an arrow R2. As the hinge unit, another mechanism may be used in which the display unit 7 and the input unit 2 can be rotatably coupled.

The hinge unit (second coupling unit) 19 is the hinge mechanism for rotatably coupling the other side (a second side) of the input unit 2 and one side of the input unit 3. The input unit 3 can be rotated relatively to the input unit 2, as indicated by an arrow R1. As the hinge unit, another mechanism may be used in which the input units 2 and 3 can be rotatably coupled.

Incidentally, if the PC body 17 is protruded under the low side of the display unit 7, a hinge unit 18 can be placed so as to rotatably couple the PC body 17 on the low side of the display unit 7 and one side of the input unit 2.

The sensor (first detector) 4 includes a sensor 4-1 and a sensor 4-2. The sensor 4-1 is placed at the low end of the display unit 7. The sensor 4-2 is placed at the first side of the input unit 2 at the position corresponding to the sensor 4-1. The sensors 4-1 and 4-2 detect whether or not the mutual relative position is closer than a predetermined distance. As a result, whether or not the input unit 2 is located at the position to cover a part of the display unit 7 can be detected.

The sensor (second detector) 5 includes a sensor 5-1 and a sensor 5-2. The sensor 5-1 is placed at the second side of the input unit 2. The sensor 5-2 is placed at the one side of the input unit 3 at the position corresponding to the sensor 5-1. The sensors 5-1 and 5-2 also detect whether or not the mutual relative position is closer than the predetermined distance. As a result, whether or not the input units 2 and 3 are located at open positions (whether or not they are located at the overlapped position) can be detected.

The sensors 4 and 5 are exemplified as a reed switch and a magnetic proximity switch with a permanent magnet. However, it is allowable to use a different sensor or switch that can detect the relative positional relation between the input unit 2 and the display unit 7 and the relative positional relation between the input units 2 and 3.

This PC 1 is designed such that the display unit 7 and the input units 2 and 3 are coupled integrally through the hinge units 18 and 19. Thus, it is possible to easily execute the settings of the respective input units (2 and 3) without searching the respective input units (2 and 3) or taking them up to a far position, when the operation with regard to the display unit 7 is executed.

The PC 1 in this state is at the state that the input units 2 and 3 are at the open states. Thus, a user can perform the input operation on any of the input units 2 and 3. In addition, the input unit 2 corresponds to the selection between the TV function and the information processing function, and the operation when the TV is displayed, and the input unit 2 corresponds to the information processing operation. The input can be executed in the input unit which is different for each function. Hence, the erroneous operation can be reduced. That is effective for using both the information processing function and the TV function simultaneously.

Figure 2A:
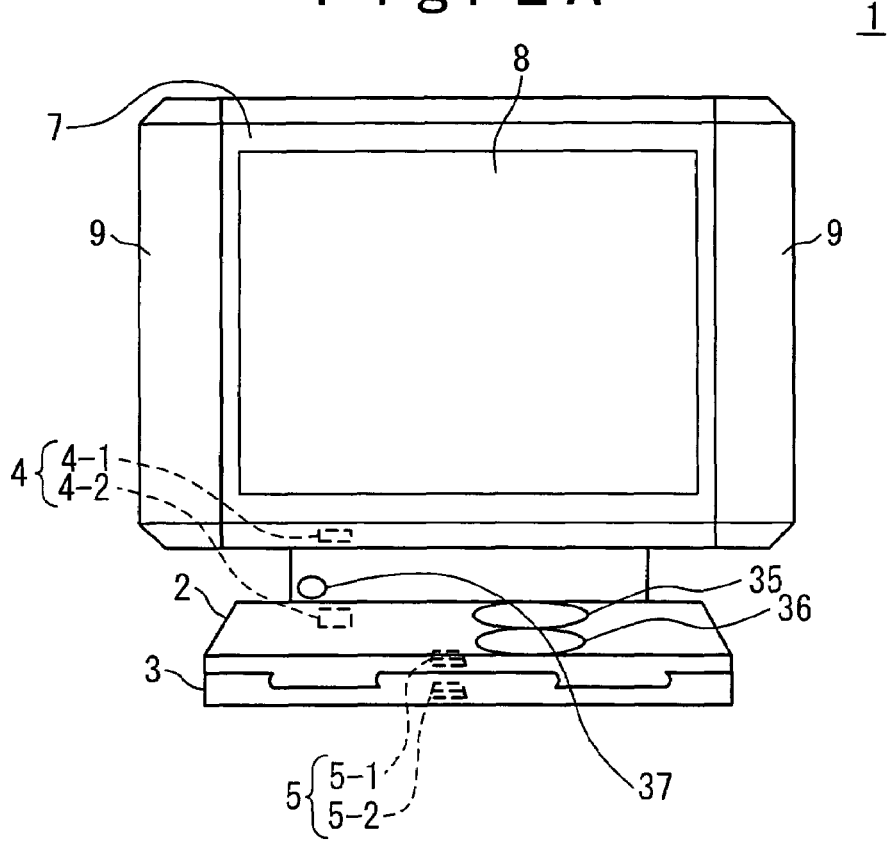
FIGS. 2A and 2B are appearance views showing the variation in the configuration of the embodiment of the information processing apparatus of the present invention.
Figure 2B:
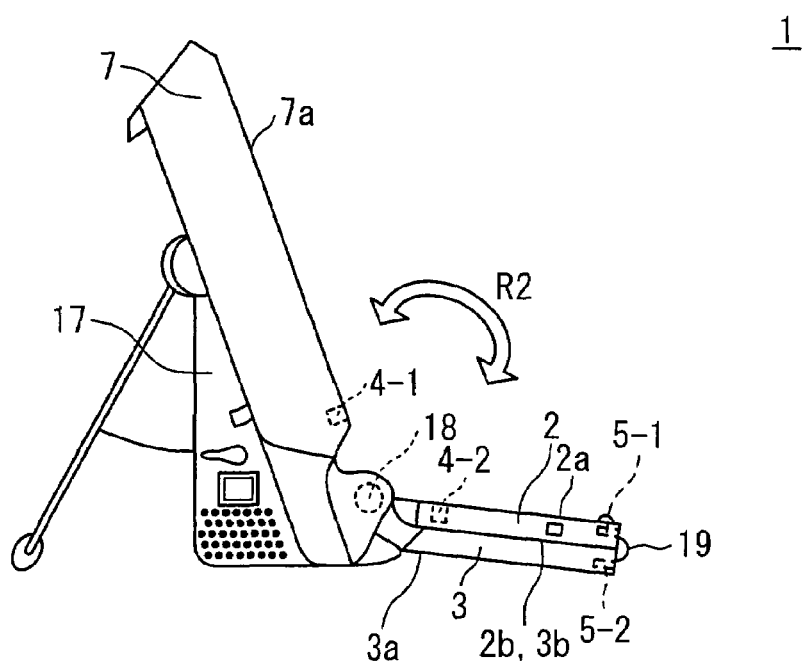

FIGS. 2A and 2B are appearance views showing the variation in the configuration of the embodiment of the personal computer to which the present invention is applied. FIG. 2A is the view from the front, and FIG. 2B is the view from the side. The configuration of the PC 1 is equal to those of FIGS. 1A and 1B. However, in this case, the input unit 3 is rotated as indicated by R1 (FIG. 1B), around the hinge unit 19, from the states of FIGS. 1A and 1B, and folded onto the low side of the input unit 2. That is, the second surface 2b of the input unit 2 and the fourth surface 3b of the input unit 3 are folded so as to face each other.

For example, if the input unit 3 is not necessary such when a user watching TV or DVD, the PC 1 is set at the state as shown in FIGS. 2A and 2B. In this case, since the input unit 2 does not occupy useless space and the work efficiency of the user is improved. In addition, it is possible to protect the erroneous input, such as the erroneous pushing of the input unit 3.

Figure 3A:
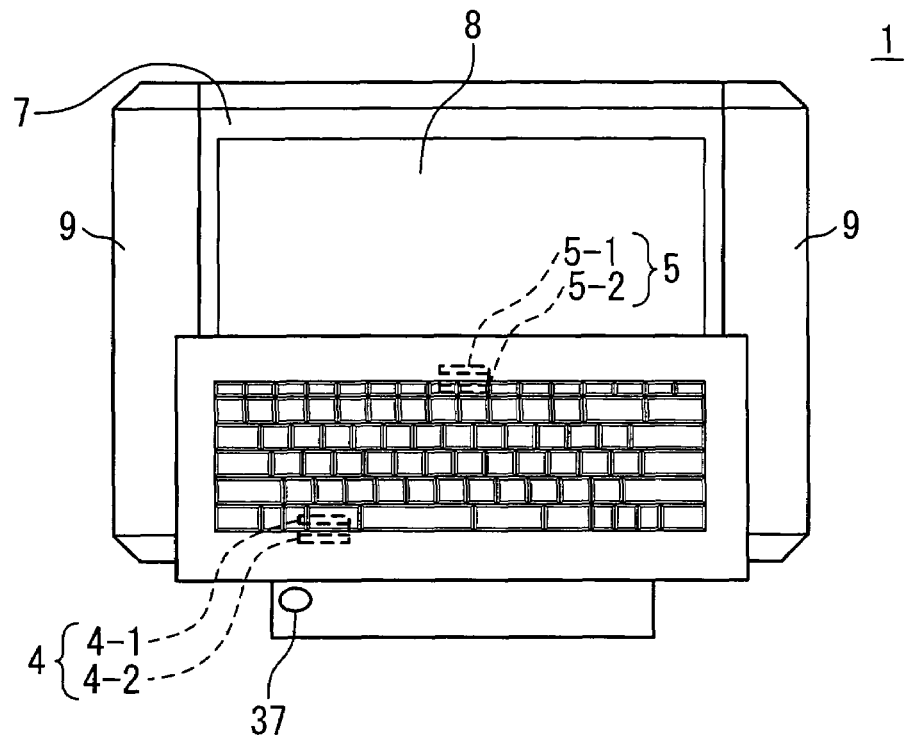
FIGS. 3A and 3B are appearance views showing another variation in the configuration of the embodiment of the information processing apparatus of the present invention.
Figure 3B:
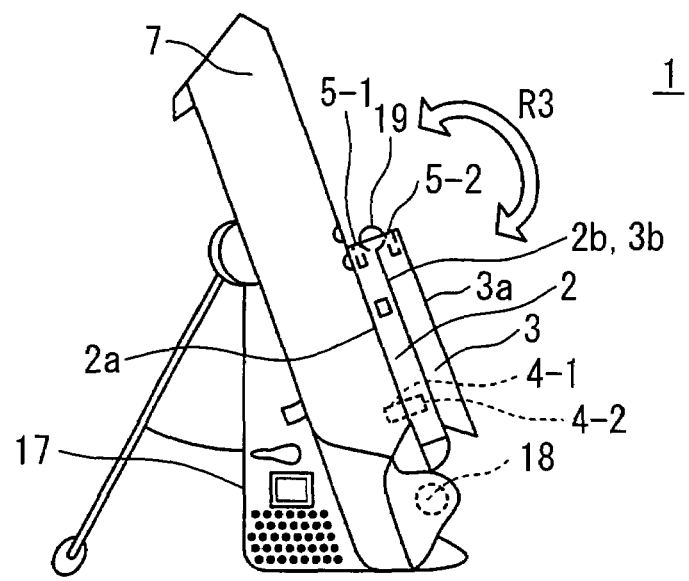

FIGS. 3A and 3B are appearance views showing another variation in the configuration of the embodiment of the personal computer to which the present invention is applied. FIG. 3A is the view from the front, and FIG. 3B is the view from the side. The configuration of the PC 1 is equal to those of FIGS. 1A and 1B. However, in this case, the input unit 2 is further rotated as indicated by R2 (FIG. 2B), around the hinge unit 18, from the states of FIGS. 2A and 2B. The input unit 2 is folded such that the input unit 2 covers the substantially lower half of the display unit 7 (the display 8). That is, the input unit 2 is folded such that the first surface 2a of the input unit 2 and the display surface 7a of the display unit 7 face each other and a part of the display surface 7a is covered.

For example, if the input unit 2 (and the input unit 2) is unnecessary in such a case that the PC 1 is not used transiently, the PC 1 is set at the state shown in FIGS. 3A and 3B. In response to the user's selection, the display unit 7 displays an image on the entire display 8, or on the uncovered upper half of the display 8. The visible region on the upper half of the display 8 of the display unit 7 can be used as the TV picture for a small screen, or the PC for the small screen. The usage of the PC for the small screen is exemplified as the indication of a watch, the indication of a scheduler, the indication of a screen saver, and the indication of a picture and a photograph. In this case, the work efficiency of the user is improved without any useless space occupation of the input units 2 and 3. In addition, it is possible to protect the erroneous input (for example, the electric power switch (not shown) is turned off) such as the erroneous pushing of the input unit 2 at any timing.

Figure 4A:
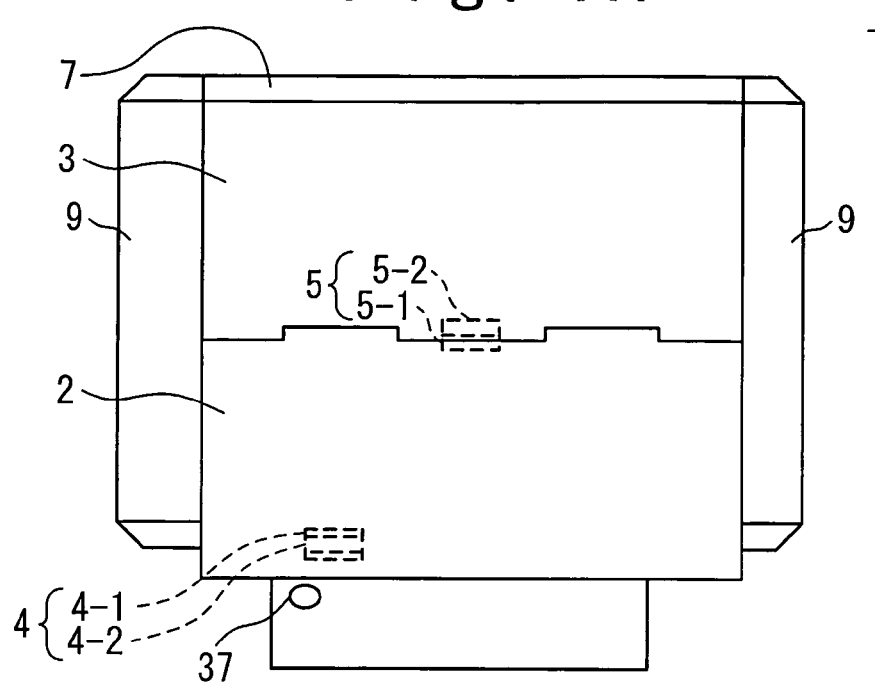
FIGS. 4A and 4B are appearance views showing another variation in the configuration of the embodiment of the information processing apparatus of the present invention.
Figure 4B:
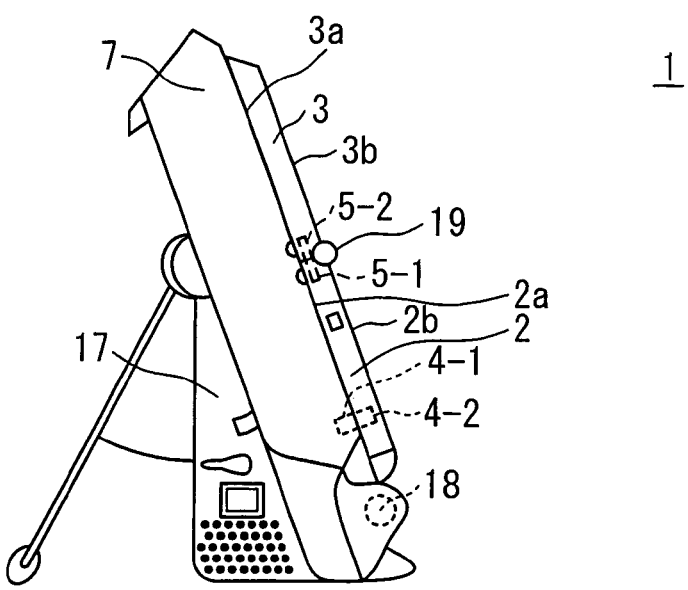

FIGS. 4A and 4B are appearance views showing another variation in the configuration of the embodiment of the personal computer to which the present invention is applied. FIG. 4A is the view from the front, and FIG. 4B is the view from the side. The configuration of the PC 1 is equal to those of FIGS. 1A and 1B. However, in this case, the input unit 3 is further rotated as indicated by R3 (FIG. 3B), around the hinge unit 19, from the states of FIGS. 3A and 3B. The input unit 3 is folded such that the input unit 3 covers the substantially upper half (a part of the portion which is not covered by the input unit 2) of the display unit 7 (the display 8). That is, the input unit 3 is folded such that not only the first surface 2a of the input unit 2 but also the third surface 3a of the input unit 3 face the display surface 7a of the display unit 7, and all the display surface 7a is covered.

For example, if the PC 1 is not used (for example, the electric power switch is off), the PC 1 is set at the state shown in FIGS. 4A and 4B. In this case, the input units 2 and 3 can protect the display 8. The work efficiency of the user is improved without any useless space occupation of the input units 2 and 3. In addition, it is possible to protect the erroneous input (for example, the electric power switch is turned on) such as the erroneous pushing of the input unit 2 and to protect a waste of the electric power.

That is, this PC 1 is coupled through the hinge units 18 and 19. Thus, the non-usage unit of any of the input units 2 and 3 can be folded so as not to induce the obstruction. Here, the two input units are explained. However, the number of the input units can be increased by rotatably fixing a third input unit to the input unit 3 through a different hinge mechanism.

Figure 5:
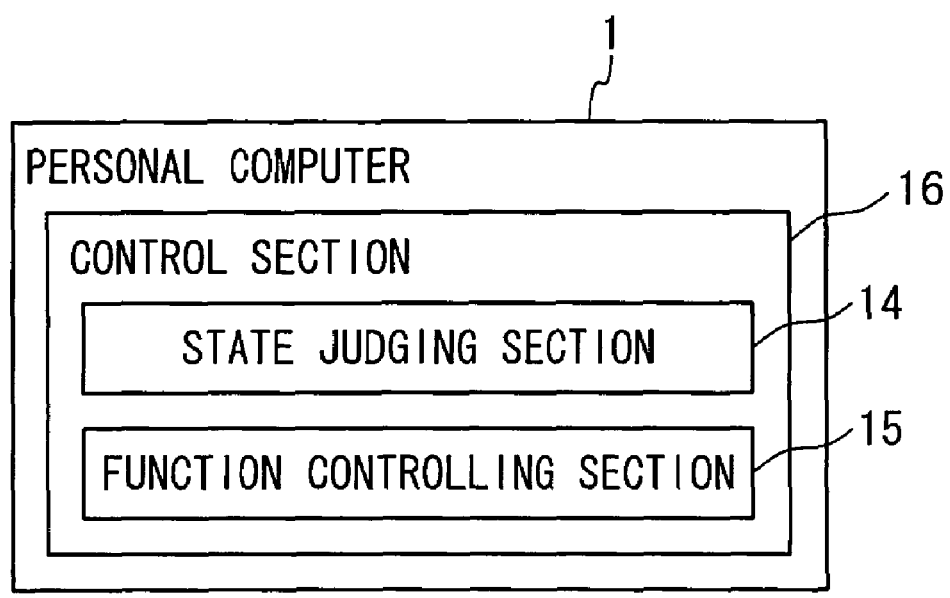
FIG. 5 is a view showing the configuration of the embodiment of the information processing apparatus of the present invention.

FIG. 5 is a view showing the configuration of the embodiment of the personal computer to which the present invention is applied. The PC 1 as the information processing apparatus includes a control section 16 as a computer program that includes a state judging section 14 and a function controlling section 15. The state judging section 14 judges the states of the display unit 7 and input units 2 and 3, based on the detection results of the sensors 4 and 5. The function controlling section 15 controls the operating functions of the input units 2 and 3 and the displaying of the display unit 7.

Figure 6:
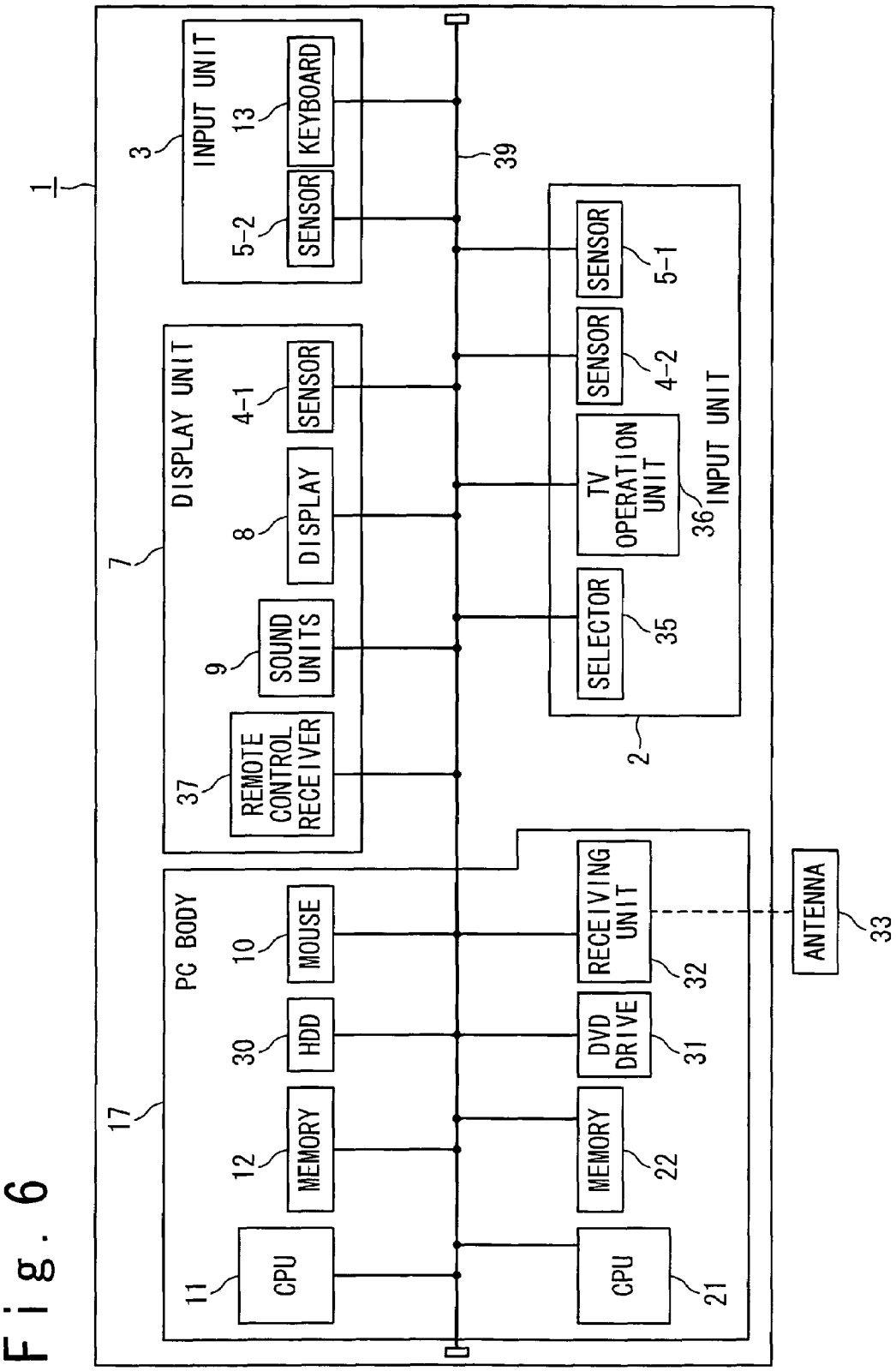
FIG. 6 is a block diagram showing the configuration of the embodiment of the information processing apparatus of the present invention.

FIG. 6 is a block diagram showing the configuration of the embodiment of the personal computer to which the present invention is applied. The PC 1 includes the PC body 17, the display unit 7, the input unit 2 and the input unit 3.

The PC body 17 includes a CPU (Central Processing Unit) 11 and a memory 12 for processing information (data). The PC body 17 additionally includes a CPU 21, a memory 22 and a receiving unit 32 connected to an antenna 33 for TV. The PC body 17 also includes a HDD (Hard Disc Drive) 30, a DVD (Digital Versatile Disc) drive 31 and a mouse 10. The display unit 7 includes the remote control receiver 37, the sensor 4-1, the display 8 and the sound units 9. The input unit 2 includes the sensor 4-2, the sensor 5-1, the selector 35 and the TV operation unit 36. The input unit 2 includes the sensor 5-2 and the keyboard 13. They are connected through a common bus 39.

The control section 16 (program) of FIG. 5 is stored in, for example, the memory 12 or the HDD 30. When the electric power switch of the PC 1 is turned on, the CPU 11 executes the control section 16. Then, the control section 16 controls the operating functions of the input units 2 and 3 and the displaying of the display unit 7, based on the detection results of the sensors 4 and 5.

Figure 7A:
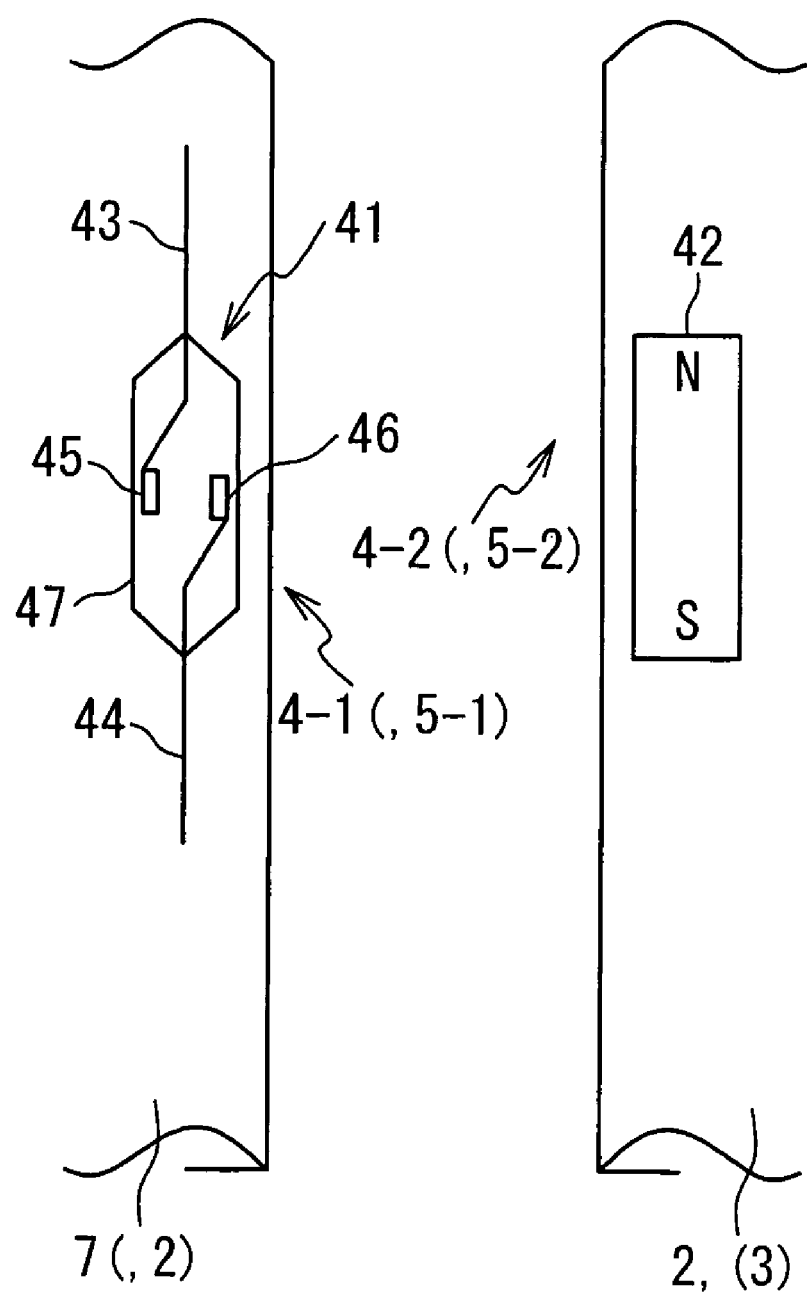
FIGS. 7A and 7B are configuration views showing examples of the sensors 4 and 5.
Figure 7B:
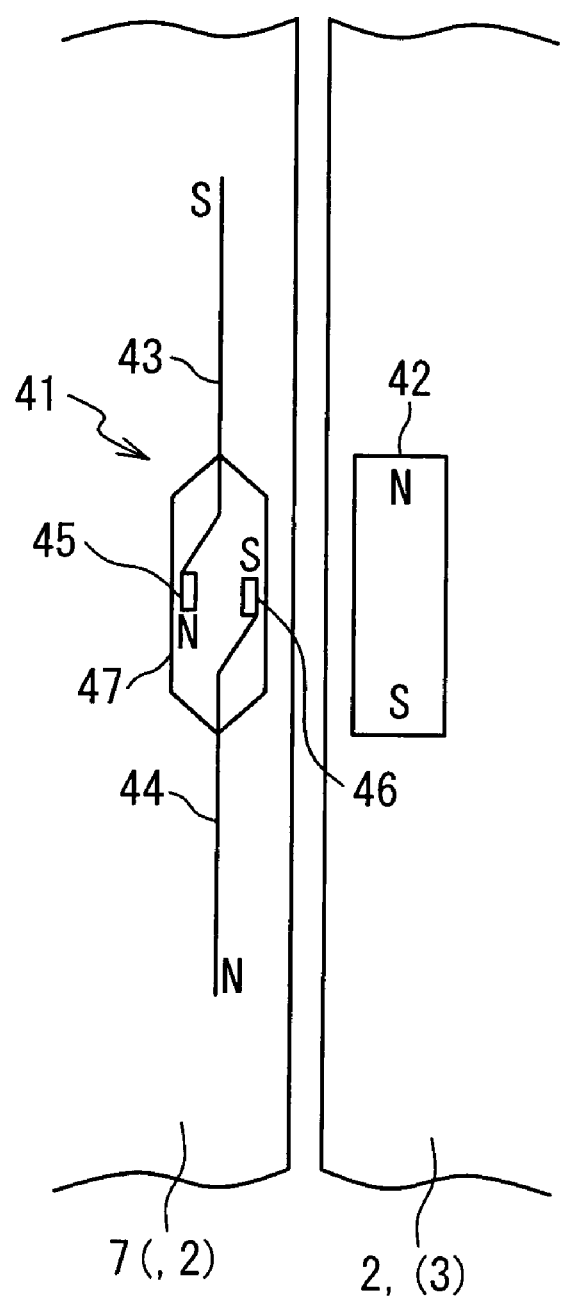

FIGS. 7A and 7B are configuration views showing examples of the sensors 4 and 5. Here, the sensor 4-1 and the sensor 5-1 are reed switches 41. The sensor 4-2 and the sensor 5-2 are permanent magnets 42. In FIG. 7A, the reed switch 41 is such that contacts 45 and 46 face each other under a certain contact interval and the contacts 45 and 46 are sealed in a glass tube 47. Here, the contacts 45 and 46 are the ends of two ferromagnetic reeds 43 and 44. From this state, when a magnetic field is applied from the permanent magnet 42 to this reed switch 41 in the axis direction of the reed, the reeds 43 and 44 are magnetized as shown in FIG. 7B. Since the contacts 45 and 46, which are the free ends facing each other, are brought into contact with each other, which enables the switch to be turned on. If the permanent magnet 42 is separated and the magnetic field is removed, the switch will be turned off (the circuit can be opened) by the elastic force of the reeds.

The embodiment of the operating method of the information processing apparatus in the present invention will be described below.

FIG. 9 is a flowchart showing the embodiment of the operating method of the personal computer to which the operating method of the information processing apparatus in the present invention is applied. In this operation, the operations of the input units 2 and 3 are controlled in response to the states of the sensors 4 and 5 as mentioned above.

In the condition that the electric power switch is already turned on, the state judging section 14 obtains (detects) the states of the sensors 4 and 5. That is, if the sensors 4 and 5 are the reed switches shown in FIG. 7A and it detects whether or not each of the sensor 4-1 and the sensor 5-1 is on (Step S01).

If the sensor 4-1 is off (Step S02: No) and the sensor 5-1 is on (Step S03: Yes), the state judging section 14 judges that the relation among the display unit 7, the input unit 2 and the input unit 3 is in a state S1 (Step S05). The state S1 is the state at which the display unit 7, the input unit 2 and the input unit 3 do not overlap with each other.

In this case, the function controlling section 15 carries out the control so that the inputs from all of the input units including the input units 2 and 3 can be received (used). Together with it, the function controlling section 15 carries out the control so that both of the information processing function and TV function about the display unit 7 can be displayed on the entire screen of the display 8 (Step S06). This state S1 is the state shown in FIGS. 1A and 1B. The PC 1 can be simultaneously used as the information processing device and the TV.

If the sensor 4-1 is off (Step S02: No) and the sensor 5-1 is off (Step S03: No), the state judging section 14 judges that the relation among the display unit 7, the input unit 2 and the input unit 3 is in a state S2 (Step S07). The state S2 is the state at which the input unit 2 and the input unit 3 overlap with each other so that the second surface 2b and the fourth surface 3b face each other, and the input unit 2 and the input unit 3 do not overlap with the display unit 7.

In this case, the function controlling section 15 carries out the control so that the inputs from the input unit 2 and the mouse 10 can be received (used) and the input from the input unit 3 cannot be received. Together with it, the function controlling section 15 carries out the control so that both of the information processing function and TV function about the display unit 7 can be displayed on the entire screen of the display 8 (Step S08). This state S2 is the state shown in FIGS. 2A and 2B. This can be used for the operation that does not use the keyboard 13, for example, watching TV and DVD.

If the sensor 4-1 is on (Step S02: Yes) and the sensor 5-1 is off (Step S04: No), the state judging section 14 judges that the relation among the display unit 7, the input unit 2 and the input unit 3 is in a state S3 (Step S09). The state S3 is the state at which the input units 2 and 3 overlap with each other so that the second surface 2b and the fourth surface 3b face each other, and the input unit 2 and the display unit 7 overlap with each other so that the first surface 2a and the display surface 7a face each other.

In this case, the function controlling section 15 carries out the control so that the input from the mouse 10 can be received (used) and the inputs from the input units 2 and 3 cannot be received. At this time, the lower half of the display 8 is covered with the input units 2 and 3, and only the upper half screen is visible. As described in the states 1 and 2, whether the image is displayed on the entire screen of the display 8 or the image is displayed only on the visible upper half screen is selected by the user's input from the mouse 10. For example, if the state 3 is detected, the function controlling section 15 adds the item to prompt its selection, to a pull-down menu through the right click of the mouse 10. The function controlling section 15 carries out the control so that the information processing function and TV function about the display unit 7 can be displayed on the entire screen of the display 8 or the upper half (the selection screen as the selected range of the screen) in response to the user's selection (Step S10). If the user does not carry out the special selection, the state immediately before is kept.

If the image is displayed only on the upper half screen, the lower half screen is the region that the user cannot view. Thus, only a predetermined image is displayed thereon. Here, the predetermined image is exemplified as the image of a single color that is constituted only by the image signal having the smallest electric power consumption of the display, or the image whose display control is easy. Those image data are stored in, for example, the memory 12 and the HDD 30.

This state S3 is the state shown in FIGS. 3A and 3B. If the user selects the mode at which only the upper half screen of the display 8 is used, for example, it can be used for the TV for the small screen or the PC for the small screen. The usage of the PC for the small screen is exemplified as the indication of the information (data) which is changed with a time, such as a watch, a scheduler, a stock price information, a weather information and a middle elapse information of a sport, the indication of a screen saver, and the indication of an image (a picture or a photograph) as an interior. In this case, the information is obtained by automatically connecting to the Internet, if necessary.

Or, it may be the small screen used for a portable information terminal or the screen indication corresponding to a pointing device. In this case, the pointing device is the mouse 10. That is, in the condition that the input units 2 and 3 are folded, by using for the indication corresponding to the small screen for the portable information terminal and the application, the spaces for the input units 2 and 3 can be used as a different work space and can be also used by the PC 1. There may be a case that this contributes to the improvement of the work efficiency of the user.

If the sensor 4-1 is on (Step S02: Yes) and the sensor 5-1 is off (Step S04: Yes), the state judging section 14 judges that the relation among the display unit 7, the input unit 2 and the input unit 3 is in a state S4 (Step S11). The state S4 is the state at which the input unit 2 and the input unit 3 overlap the display unit 7 so that the first surface 2a and the third surface 3a face the display surface 7a.

In this case, the function controlling section 15 carries out the control so that the inputs from all of the input units including the input units 2 and 3 cannot be received (used). Together with it, the function controlling section 15 caries out the control so that both of the information processing function and TV function about the display unit 7 cannot be displayed (Step S12). Then, if the information processing function is under operation, a resume function is executed by storing the present state to transfer the present state to another state such as an electric power saving mode, a standby mode, a electric power off mode or the like (Step S13). This state S4 is the state shown in FIGS. 4A and 4B. The display of the PC 1 cannot be physically viewed. That is, this is the state at which the PC 1 is not used. Thus, the state at which the electric power consumption is minimized is set. The user can do this setting.

Figure 8:
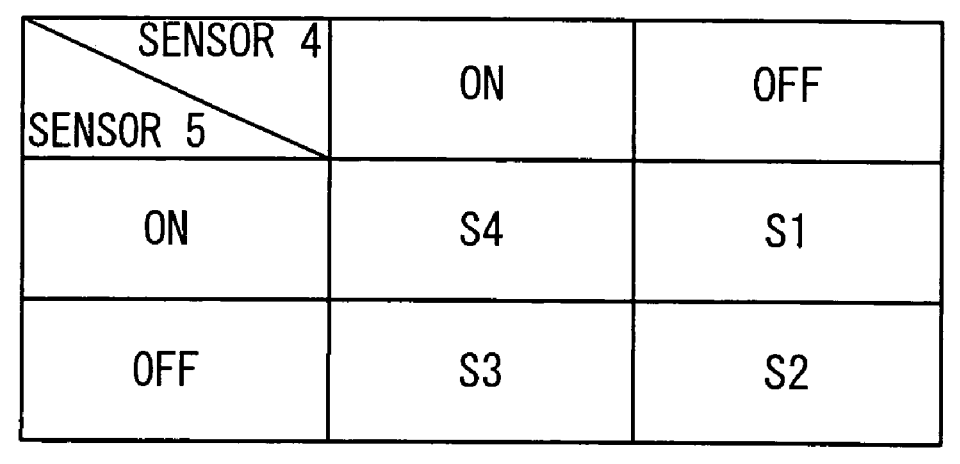

FIG. 8 is a table showing the correspondence between the states of the sensor 4 and the sensor 5 and the above-mentioned states S1 to S4. This table is stored in the memory 12 or HDD 13. An "ON" indicates that the sensor 4 (the sensor 4-1) or the sensor 5 (the sensor 5-1) is on. An "OFF" indicates that the sensor 4 (the sensor 4-1) or the sensor 5 (the sensor 5-1) is off. At the steps S05, S07, S09 and S11, when the state judging section 14 judges the respective states, this table is used.

The information processing apparatus according to the present invention has the input units 2 and 3 and can make them treat with the two different functions (the TV function and the information processing function). Thus, the input can be done in the input unit that is different for each function, and the erroneous operation can be reduced. The input units 2 and 3 are coupled through the hinge units 18 and 19 to the display unit 7. Thus, at least one of the input units 2 and 3, which is not used, can be folded so as not to induce the obstruction. Hence, the work efficiency of the user can be improved. In response to the states of the input units 2 and 3, the displaying of the display unit 7 and the inputs of the input units 2 and 3 can be limited, thereby attaining the user-friendly apparatus. When the operation with regard to the display unit 7 is executed, it is not necessary to search the respective input units (2, 3) or take them up to the far position.

What is claimed is:

1. An information processing apparatus, comprising:
a display unit;
a first input unit;
a second input unit;
a first coupling unit which rotatably couples said display unit with a first side of said first input unit; and
a second coupling unit which rotatably couples said second input unit with a second side of said first input unit, wherein,
said display unit has a display surface,
said first input unit has a first surface on which a first input operating unit is placed for an input operation and a second surface which is a side opposite to said first surface,
second input unit has a third surface on which a second input operating unit is placed for an input operation and a fourth surface which is a side opposite to said third surface, and
said second input unit is foldable such that said fourth surface faces said second surface.

2. The information processing apparatus according to claim 1, wherein said first input unit is foldable such that said first surface overlaps with a part of said display surface.

3. The information processing apparatus according to claim 2, wherein said second input unit is foldable such that said third surface overlaps with a remaining part of said display surface, when said first input unit is folded such that said first surface overlaps with said part of said display surface.

4. The information processing apparatus according to claim 1, further comprising:
a control unit which controls said display unit,
wherein said control unit controls to accept inputs from said first input unit and said second input unit, when said display unit, said first input unit and said second input unit do not overlap with each other.

5. The information processing apparatus according to claim 4, wherein said control unit controls not to accept input from said second input unit, when said first input unit and said second input unit overlap with each other such that said second surface faces said fourth surface and said first input unit does not overlap with said display unit.

6. The information processing apparatus according to claim 4, wherein said control unit controls not to accept inputs from said first input unit and said second input unit, when said first input unit and said second input unit overlap with each other such that said second surface faces said fourth surface and said first input unit and said display unit overlap with each other such that said first surface faces said display surface.

7. The information processing apparatus according to claim 4, wherein said control unit controls not to accept inputs from said first input unit and said second input unit and not to display anything on said display unit, when said display unit overlaps with said first input unit and said second input unit such that said display surface faces said first surface and said third surface.

8. The information processing apparatus according to claim 4, further comprising:
a first detector which is placed in at least one of said display unit and said first input unit, and detects a positional relation between said display unit and said first input unit; and
a second detector which is placed in at least one of said first input unit and said second input unit, and detects a positional relation between said first input unit and said second input unit,
wherein said control unit controls input from said first input unit and said second input unit and displaying on said display unit, based on said detection results form said first detector and said second detector.

9. The information processing apparatus according to claim 1, wherein said first input operating unit selects at least one of a information processing function and a television function for operation in said information processing apparatus, based on an input of a user.

10. An information processing apparatus comprising:
a display unit;
a first input unit;
a second input unit;
a first coupling unit which rotatably couples said display unit with a first side of said first input unit; and
a second coupling unit which rotatably couples said second input unit with a second side of said first input unit.

11. The information processing apparatus according to claim 10, wherein,
said first coupling unit is a first hinge, the first hinge connected to said display unit and the first side of said first input unit, and coupling said display unit with the first side of said first input unit rotatably about a first axis through the first hinge, and
said second coupling unit is a second hinge, the second hinge connected to said second input unit and the second side of said first input unit, and coupling said second input unit with the second side of said first input unit rotatably about a second axis through the second hinge.

* * * * *